United States Patent [19]

Gaske et al.

[11] 4,384,070

[45] May 17, 1983

[54] PIGMENTED, ANTIOXIDANT-CONTAINING SOLUTION COATING COMPOSITIONS

[75] Inventors: Joseph E. Gaske, Mt. Prospect; Thomas H. Plaisance, Wilmette; Hannu K. Pennanen, Elk Grove, all of Ill.

[73] Assignee: DeSoto, Inc., Des Plaines, Ill.

[21] Appl. No.: 279,725

[22] Filed: Jul. 2, 1981

[51] Int. Cl.³ .............. C08G 63/00; C08L 81/04; C08L 83/04; C08K 3/34

[52] U.S. Cl. ............... 524/597; 524/267; 524/476; 524/484; 524/588; 524/609; 525/437; 525/442; 525/443; 525/446; 525/441; 525/519; 525/535

[58] Field of Search ......... 260/31.4 R, 33.1 R, 260/33.4 SB, 33.6 SB, 33.4 R, 33.6 R; 525/437, 442, 474, 443, 446, 441, 519, 535; 524/588, 597, 267, 609, 476, 484

[56] References Cited

U.S. PATENT DOCUMENTS

| | | | |
|---|---|---|---|
| 3,402,134 | 9/1968 | Berenbaum et al. | 260/18 R |
| 3,449,465 | 6/1969 | Golitz et al. | 260/33.4 SB |
| 3,505,258 | 4/1970 | Panek et al. | 260/24 |
| 3,645,956 | 2/1972 | Doughty et al. | 260/32.6 A |
| 3,838,078 | 9/1974 | Villa | 525/437 |
| 3,919,147 | 11/1975 | Villa | 525/535 |
| 4,024,100 | 5/1977 | Kuhn et al. | 260/33.6 SB |
| 4,101,496 | 7/1978 | Dorffel et al. | 525/443 |
| 4,113,793 | 9/1978 | Sekmakas | 525/443 |
| 4,140,729 | 2/1979 | Tobias et al. | 260/33.4 R |
| 4,238,583 | 12/1980 | Tobias et al. | 525/443 |
| 4,238,585 | 12/1980 | Bertozzi | 525/535 |
| 4,243,573 | 1/1981 | Simms | 260/33.6 R |
| 4,279,800 | 7/1981 | Boomgaard et al. | 525/519 |

Primary Examiner—Melvyn I. Marquis
Assistant Examiner—Herbert J. Lilling
Attorney, Agent, or Firm—Dressler, Goldsmith, Shore, Sutker & Milnamow, Ltd.

[57] ABSTRACT

Pigmented coating solutions are disclosed which deposit coatings possessing improved resistance to ultraviolet radiation-induced auto-oxidation. These solutions contain organic solvent, including aromatic hydrocarbon solvent, having dissolved therein an aromatic hydrocarbon-soluble, normally liquid, polysulfide or polydisulfide derivative having terminal -SH groups which have been reacted with a monofunctional reactant providing a $C_1$-$C_{22}$ alkyl terminal group to provide an essentially nonreactive derivative. The solvent also has dissolved therein a polar polymeric binder (preferably thermosetting) which degrades by a photo-oxidative mechanism and which has only limited compatibility with the derivative. The pigment protects the bulk of a deposited coating, and the limited compatibility causes a heated film of the coating solution to stratify as the solvent evaporates to concentrate the derivative at the surface of the cured coating to protect the same.

11 Claims, No Drawings

PIGMENTED, ANTIOXIDANT-CONTAINING SOLUTION COATING COMPOSITIONS

DESCRIPTION

1. Technical Field

This invention relates to pigmented solution coating compositions which contain antioxidants which concentrate at the surface of the coating when it is baked to provide improved weathering resistance.

2. Background Art

The application of pigmented solution coating compositions to protect a substrate against weathering is commonplace. The usual substrate are metal substrates, especially iron. Where baking facilities are available, it is better to employ a paint containing a thermosetting binder, and the paint is cured by baking which serves to drive off the organic solvent and cause the curing reaction to occur. However, ultraviolet radiation induces auto-oxidation which causes the applied paint to deteriorate. The pigment functions to protect the interior of the paint film by preventing the ultraviolet radiation from penetrating, but the surface of the paint film is not well protected.

Antioxidants have been incorporated into paints to improve their weathering resistance. Unfortunately, effective antioxidants are expensive, and they must be used in a significant proportion before they contribute effective protection at the surface.

This invention overcomes these prior art inadequacies by finding materials which function as antioxidants and which concentrate at the surface of the cured coating to protect the same, even when used at lower concentrations than was previously deemed necessary. A further advantage of the materials which function as antioxidants in this invention is that they are less costly than those used heretofore.

DISCLOSURE OF INVENTION

In accordance with this invention, a pigmented coating solution adapted to deposit an organic coatings possessing improved resistance to ultraviolet radiation-induced auto-oxidation is based on an organic solvent medium which includes aromatic hydrocarbon solvents. There is dissolved in the solvent medium an aromatic hydrocarbon-soluble, normally liquid, polysulfide or polydisulfide having terminal —SH groups which have been reacted with a monofunctional reactant providing a $C_1$–$C_{22}$ alkyl terminal group. This provides an anti-oxidant which is compatible in the paint because of its aromatic hydrocarbon solubility, however, the polysuflide or polydisulfide is rendered essentially nonreactive by the monofunctional reactant, so it becomes incompatible with the polymeric binder which is also dissolved in the solvent medium as the solvent evaporates during the bake.

The polysulfide or polydisulfide derivative described above is used in an amount of 0.5% to 5%, based on total solids. The solution also contains pigment, such as titanium dioxide, which is ultraviolet light absorptive and is present in a pigment to binder weight ratio of at least about 0.1 to protect the bulk of a deposited coating. The limited compatibility with the polymeric binder, which is usually reactive to provide a thermosetting coating, causes the polysulfide or polydisulfide derivative to concentrate in a heated deposited film at the surface where it is in position to protect the surface against ultraviolet radiation.

The polysulfide or polydisulfide derivative used in this invention is an essentially nonreactive material since its terminal —SH groups have been consumed by reaction and replaced by terminal alkyl groups which are nonpolar and nonreactive. Polar polymeric binders, in contradistinction, contain functional groups which are both reactive and polar. Accordingly, when a coating containing a polar polymeric binder and the nonreactive alkyl-terminated polysulfide or polydisulfide derivative in compatible aromatic solvent solution is deposited upon a substrate and baked, the polar reactive groups of the polymeric binder react and the nonreactive terminal nonpolar hydrocarbon groups of the polysulfide or polydisulfide derivative become incompatible and are squeezed away from the binder, which is preferably thermosetting, to concentrate at and near the exposed surface of the coating.

In this invention the polymeric binder comprises a polymer which degrades by an oxidative mechanism and which is polar so as to separate from the polysulfide or polydisulfide derivative on baking. This polymer is preferably thermosetting, but polar thermoplastic polymers, like Mylar, are also useful.

The reactive groups in the binder resin are subject to considerable variation and they may be present in a single self-curing resin or in a mixture of reactive resin and curing agent therefor. The reactive groups which are preferred are: N-methylol, methylol, hydroxy and carboxyl. The reactive group may be blocked to prevent premature reaction and unblocked on baking, as illustrated by N-methylol acrylamide which can be blocked by etherifying it with an alcohol, typically a butyl alcohol. The reactive group or groups are preferably present in a polyester resin, particularly those cured with an aminoplast resin, like a heat-hardening melamine-formaldehyde condensate.

Appropriate polyester resins are hydroxy functional polyesters made by reacting a small excess of a polyhydric alcohol with a polycarboxylic acid. A preferred polyester would be a largely linear polyester made by reacting from 1.03 to 1.2 hydroxy equivalents of diol with 1 equivalent of carboxyl functionality in a dicarboxylic acid. The system may be self-curing, or an extraneous curing agent may be added to cure hydroxy or carboxyl functionality in the polyester.

It is particularly preferred to include a silicone resin component in order to provide systems having the best weather resistance. These silicone resins may vary considerably, as is known in the art, but it is preferred to employ an organopolysiloxane which is methoxy functional, a methoxy content of from 10% to 25% being preferred. These polysiloxanes may be prereacted with a portion of the binder. The methoxy functionality may be replaced by hydroxy groups or by other alkoxy groups, such as the ethoxy group.

The preferred polysiloxanes are methyl and/or phenyl-substituted polysiloxanes having an average molecular weight in the range of about 400 to about 6000, preferably 500 to 3000. These desirably contain from 1 to 10, preferably from 2 to 6 reactive groups per molecule. These polysiloxanes are illustrated by a methyl and phenyl substituted polysiloxane having a molecular weight of about 600 and a methoxy content of 15% by weight. Methoxy functionality is preferred and the molecular weight is by number average. Commercially satisfactory polysiloxanes are shown in the examples.

The silicones can be prereacted with all or a portion of the polyester, or used separately, as desired. The proportion of silicone resin may vary from 5–50%, preferably from 10–30%.

Referring more particularly to the aromatic hydrocarbon-soluble, normally liquid, polysulfide or polydisulfide having terminal —SH groups, dithiol polydisulfides are preferred, these having the formula:

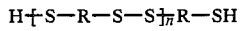

where n is from 2–50, preferably from 4–20, and R is an aliphatic radical having from 1–20, preferably from 2–18 carbon atoms.

The particularly preferred compounds are dithiol polydisulfides having the formula:

where n is desirably in the range of 3–10. When n has a value of about 5, we have what is termed dithiol polydisulfide A which is used in the accompanying Examples. A commercially available material which may be used as the dithiol polydisulfide A can be obtained from Thiokol Company under the trade designation LP-3.

While polydisulfides are preferred, polysulfides made by reacting excess dimercaptan having the formula HS-R'-SH, where R' is a divalent hydrocarbon radical with butadiene can also be used. The product obtained by heat reacting 3 moles of 1,4-butane dimercaptan with 2 moles of butadiene will illustrate a suitable polysulfide.

These polysulfides and disulfides are then terminated (blocked) in various ways to provide the desired alkyl terminal group. The preferred alkyl groups will contain from 1–8 carbon atoms. These are provided in a particularly effective form using acetic anhydride which provides an acetyl terminal moeity which supplies the methyl terminal group.

EXAMPLE 1

655 grams of dithiol polysulfide A containing 5.9 weight percent mercaptan functionality (0.59 mol providing 1.17 equivalents of SH) is heated to 70° C. in a 2 liter four necked flask equipped with stirrer, nitrogen inlet, addition funnel and reflux condenser. A slow nitrogen sparge is used throughout the reaction. 345 grams of octadecyl isocyanate (1.17 mol providing 1.17 equivalents of NCO) is placed in the addition funnel and added to the flask over a 2 hour period. The temperature is then increased slowly to 105° C. over a one and one half hour period and held there until the unreacted isocyanate content is below 1%. The liquid contents of the flask are then removed and it soldifies on cooling to provide a waxy solid which melts over the range of 50° C.–70° C. The product is now essentially nonreactive since all of the mercaptan groups are reacted and terminal octadecyl groups are present in their place.

EXAMPLE 2

425 grams of dithiol polysulfide A (0.38 mol providing 0.76 equivalent of SH) is heated to 80° C. in the equipment described in Example 1 and 0.76 mol of n-butyl isocyanate is added over 40 minutes. The temperature is then raised to 104° C. and held there for 2 hours. Dibutyl tin dilaurate catalyst is then added (0.04% by weight) and heating is continued until the unreacted isocyanate content is below 1%. The product is again nonreactive because all of the mercaptan groups are reacted and terminal n-butyl groups are present in their place.

EXAMPLE 3

Into a 1 liter four necked flask equipped with stirrer, nitrogen sparge and reflux condenser, is placed 300 gram of dithiol polysulfide A (0.27 mol providing 0.54 equivalent of SH) and 84 gram of acetic anhydride (0.82 mol providing 0.82 equivalent of anhydride functionality). The mixture is heated to 84° C. where reflux begins. During a 1 hour period the temperature is increased to 110° C. with all distillate collected. During the next hour the temperature is increased to 150° C. and the distillate is again collected. The batch is then cooled and 200 grams of water are added containing 44 grams of dissolved sodium hydroxide. The mixture is stirred for 10 minutes and the product is mixed with 500 grams of toluene and the mixture is allowed to separate into two layers. The toluene extract is then washed with 100 grams of water. The water extracts are then combined and shaken with 100 grams of toluene to remove any remaining toluene-soluble material and the mixture is allowed to stand and then separated. The toluene-containing layers are then combined and distilled to a solids content of 78%, this distillation removing most of the odorous cyclic sulfur compounds which were formed. The product is nonreactive because all of the SH groups have reacted with the acetic anhydride to provide terminal methyl groups in their place.

EXAMPLE 4

130 grams of isophorone diisocyanate (0.59 mol providing 1.18 equivalent of isocyanate functionality in the compound 3-isocyanatomethyl-3,5,5-trimethyl cyclohexylisocyanate) is charged to the equipment described in Example 3 and heated to 80° C., and 327 grams of dithiol polysulfide A (0.29 mol providing 0.58 equivalent of —SH) is added dropwise over a period of 2 hours. After addition is completed, hold at 80° C. for 1 hour and then add 196 grams of toluene and 0.25 gram of dibutyltindilaurate. Hold for 1 hour and then add 47 grams of n-butanol (a 10% stoichiometric excess based on NCO) and stir for half an hour. When the residual isocyanate content is less than 1%, a liquid product is provided having a nonvolatile solids content of 74.2% and a Gardner-Holdt viscosity of W. In this product, the —SH groups are reacted and terminal groups are present instead.

EXAMPLE 5

788 grams of dithiol polydisulfide A (0.705 mol providing 1.41 equivalent of —SH) is reacted with 1.65 mol of n-butyl glycidyl ether in the presence of 1 gram of triethyl amine catalyst for the mercaptan-epoxy reaction. After slowly heating to 120° C., a mild exotherm carries the temperature to 150° C. 200 grams of toluene are then added to cool the material and the batch is stirred for 15 minutes. The product is a liquid having a Gardner-Holdt viscosity of T-U and a solids content of 73.17%. In this product, the —SH groups are consumed and replaced by terminal butyl groups.

EXAMPLE 6

(Preparation of Reactive High Molecular Weight Polyester)

1040 grams of phthalic anhydride 2, 280 grams of isophthalic acid and 250 grams of adipic acid were esterified at 210° C. with the following polyols:

neopentyl glycol: 822 grams
hexanediol: 310 grams
trimethylol propane: 45 grams

The polyesterification was continued to an acid value of 15.2. During the reaction, 236 grams of water distilled off. 1160 grams of aromatic solvent (Ashland Hi-Sol 4–1) and 130 grams of butanol were added. The polyester so-produced has an hydroxy number of 90 and the solution has the following characteristics:

Solids content: 66.7%
Viscosity (Gardner-Holdt): $Z_1$
Color (Gardner): 2–3

EXAMPLE 7

(Preparation of Reactive, Low Molecular Weight Branched Polyester)

The following components are mixed together and refluxed at 230° C. until 148 cc of water are removed.

Trimethylol propane: 446 grams
Neopentyl glycol: 124 grams
Isophthalic acid: 250 grams
Adipic acid: 292 grams
2-ethoxyethyl acetate: 15 grams
Xylol: 15 grams Upon removal of the desired amount of water, the acid value is 4.6 and the product is cooled to 140° C.

EXAMPLE 7A (Preparation of Nonfunctional Reaction Product)

810 grams of 2-ethoxyethyl acetate, 950 grams of General Electric Siloxane SR-191 (methyl and phenyl substituted polysiloxane containing 15% methoxy and a molecular weight of about 800) and 1.0 gram of tetraoctyl titanate catalyst are premixed and added to the polyester product previously produced. The mixture is heated to 150° C. and 80 grams of methanol are removed. The product is held for a Gardner-Holdt viscosity of U-W. 76 grams of butanol are then added and the product is cooled to 110° C.

The polyester component described previously was produced using 12.2 mols of hydroxy functionality and 7.0 mols of carboxyl functionality which supplies an excess of 5.2 mols of hydroxy. The siloxane provides 4.8 mols of methoxy functionality, so the final product has very little residual functionality after the methoxy functionality has consumed most of the hydroxy functionality in the polyester.

EXAMPLE 8

A dark olive green pigmented coil coating composition was prepared as follows:

44.0 grams 9.09% by weight Flexowax "C" light (Glyco Chemicals, Inc.) dissolved in aromatic hydrocarbon solvent mixture (Solvesso SC 100)
50.0 grams resin solution of Example 7
70.0 grams resin solution of Example 6
4.8 grams Lampblack #30 (General Carbon Co.)
56.0 grams Mapico Tan 190 10 (Iron Oxide) Columbia Carbon Co.
62.0 grams Titanium dioxide R-960 (E. I. duPont Co.)

Mix to a uniform paste and sand mill grind to 7½ (North Standard gauge) in a laboratory sand mill.

Premix the following to 5½ (North Standard guage) with a Cowles mixer and blend with the sand mill ground dispersion.

| | |
|---|---|
| 40.0 | grams amorphous silica, Syloid 74 (W. R. Grace) |
| 40.0 | grams aromatic hydrocarbon solvent mixture (Solvesso SC 100) |
| 40.0 | grams resin solution of Example 7 |
| 180.0 | grams resin solution of Example 6 |
| | Add in order shown while mixing: |
| 35.5 | grams resin solution of Example 7 |
| 251.3 | grams resin solution of Example 6 |
| 52.2 | grams melamine aminoplast, Resimene X-740 (Monsanto Chem. Co.) |
| 2.8 | grams 25% p-toluene sulfonic acid in isopropanol |
| 71.4 | grams aromatic hydrocarbon solvent mixture (Solvesso SC 100) |
| 1000.0 | grams |

EXAMPLE 9

12.2 grams of the antioxidant solution of Example 3 were added to 500 grams of the paint of Example 8.

The paints of Examples 8 and 9 were drawn over 19 mil thick Parker 721-S treated aluminum panels with a #38 wire wound rod. The panels were baked at 550° F. for 30 seconds in a gas fired chamber oven to a peak metal temperature of 450° F. The panels were then exposed in an Atlas XW-R unshielded dew cycle weatherometer (Atlas Electric Devices, Chicago, Ill.) which was operated on 60 minute arc light on and 60 minute light off cycle, with cooling water spray on backs of panels during off periods. The color changes were determined in a conventional manner using a Hunterlab Color/Difference meter D 25-2 instrument (Hunter Associates Laboratory, Inc., Fairfax, Va.) and are expressed in $\Delta E$ units using the Hunterlab $\Delta E$ computer. One $\Delta E$ (National Bureau of Standards) unit being that which is just barely discernible to the "average" human eye as a difference in color. Chalk values were determined using ASTM standard test designation D659-44 procedure and employing a ⅞ inch Round Model Jackobsen Chalk Tester (Gardner Laboratories, Inc.) Gloss was measured with a Hunterlab D 48 D Gloss-meter. After 400 total hours of exposure, the values were:

| | $\Delta E$ | 60° Gloss Retention | Chalk |
|---|---|---|---|
| Example 8 | 6.5 | 4.0% | 10 |
| Example 9 | 2.6 | 40.0% | 10 |

What is claimed is:

1. A pigmented coating solution adapted to deposit an organic coating possessing improved resistance to ultraviolet radiation-induced auto-oxidation comprising, organic solvent including aromatic hydrocarbon solvent, said solvent having dissolved therein an aromatic hydrocarbon-soluble, normally liquid, polysulfide or polydisulfide derivative in which the terminal —SH groups have been reacted with a monofunctional reactant providing a $C_1$–$C_{22}$ alkyl terminal group to provide a polysulfide or polydisulfide derivative which is essentially nonreactive, said solvent also having dissolved therein a polar polymeric binder which degrades by a photo-oxidative mechanism and which has limited compatibility with said derivative, said derivative being present in an amount of 0.5% to 5%, based on total solids, and said solvent having suspended therein a pigment which is ultraviolet absorptive and which is present in a pigment to binder weight ratio of at least about 0.1, said pigment protecting the bulk of a deposited coating, and said limited compatibility causing a heated film of said coating solution to stratify as the solvent evaporates to concentrate said polysulfide or polydisulfide at the surface of the cured coating to protect the same.

2. A coating solution as recited in claim 1 in which said polar polymeric binder is thermosetting.

3. A coating solution as recited in claim 2 in which said thermosetting binder comprises a polyester resin in admixture with an aminoplast resin.

4. A coating solution as recited in claim 3 in which said polyester resin is the hydroxy functional polyester made by reacting from 1.03 to 1.2 hydroxy equivalents of diol with 1 equivalent of carboxy functionality in a dicarboxylic acid component.

5. A coating solution as recited in claim 4 in which said aminoplast resin is a heat-hardening melamine-formaldehyde condensate.

6. A coating solution as recited in claim 2 in which said polar polymeric binder comprises from 5% to 50% of silicone resin.

7. A coating solution as recited in claim 1 in which there is used a polydisulfide having the formula:

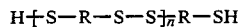

where n is from 2-50 and R is $C_1$-$C_{20}$ aliphatic.

8. A coating solution as recited in claim 1 in which there is used a polydisulfide having the formula:

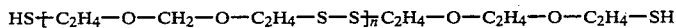

where in is in the range of 3-10.

9. A coating solution as recited in claim 1 in which the terminal —SH groups of said polysulfide or polydisulfide derivative are terminated by reaction with acetic anhydride.

10. A coating solution as recited in claim 1 in which the terminal —SH groups of said polysulfide or polydisulfide derivative are terminated with octadecyl radicals.

11. A pigmented coating solution adapted to deposit an organic coating possessing improved resistance to ultraviolet radiation-induced auto-oxidation comprising, organic solvent including aromatic hydrocarbon solvent, said solvent having dissolved therein an aromatic hydrocarbon-soluble, normally liquid, polysulfide or polydisulfide derivative in which the terminal —SH groups have been reacted with a monofunctional reactant providing a $C_1$-$C_{22}$ alkyl terminal group to provide a polysulfide or polydisulfide derivative which is essentially nonreactive, said solvent also having dissolved therein a polar polymeric binder which degrades by a photo-oxidative mechanism and which has limited compatibility with said derivative, said derivative being present in an amount of 0.5% to 5%, based on total solids, and said solvent having suspended therein a pigment which is ultraviolet absorptive and which is present in a pigment to binder weight ratio of at least about 0.1.

* * * * *

UNITED STATES PATENT AND TRADEMARK OFFICE
CERTIFICATE OF CORRECTION

PATENT NO. : 4,384,070
DATED : May 17, 1983
INVENTOR(S) : Joseph E. Gaske, Thomas H. Plaisance and Hannu K. Pennanen It is certified that error appears in the above—identified patent and that said Letters Patent is hereby corrected as shown below:

Column 5, line 67, "Mapico Tan 190 10" should read:
-- Mapico Tan #10 --

Column 8, line 11 (Claim 8, line 4), "where in is in the range of 3-10" should read:
-- where n is in the range of 3-10 --

Signed and Sealed this

Sixth Day of September 1983

[SEAL]

Attest:

GERALD J. MOSSINGHOFF

Attesting Officer — Commissioner of Patents and Trademarks